United States Patent [19]
Dahl et al.

[11] 3,956,240
[45] May 11, 1976

[54] NOVEL POLYKETONES

[75] Inventors: Klaus J. Dahl, Palo Alto; Viktors Jansons, Los Gatos, both of Calif.

[73] Assignee: Raychem Corporation, Menlo Park, Calif.

[22] Filed: Sept. 3, 1974

[21] Appl. No.: 502,643

Related U.S. Application Data

[63] Continuation-in-part of Ser. No. 378,616, July 12, 1973, abandoned.

[52] U.S. Cl. .................. 260/47 C; 260/47 R; 260/47 XA; 260/49; 260/50; 260/61; 260/79
[51] Int. Cl.² .................. C08G 8/02; C08G 10/00; C08G 83/00
[58] Field of Search .................. 260/47 C, 61, 47 R, 260/50

[56] References Cited
UNITED STATES PATENTS

| | | | |
|---|---|---|---|
| 3,065,205 | 11/1962 | Bonner et al. | 260/63 |
| 3,324,199 | 6/1967 | Tocker | 260/857 |
| 3,442,857 | 5/1969 | Thornton | 260/47 |
| 3,516,966 | 6/1970 | Berr | 260/47 |
| 3,637,592 | 1/1972 | Berr | 260/47 |
| 3,734,888 | 5/1973 | Darms | 260/47 |

*Primary Examiner*—Lester L. Lee
*Attorney, Agent, or Firm*—Lyon and Lyon

[57] ABSTRACT

Melt-stable aromatic polyketones useful in, eg, electrical insulation and comprised of, eg, the recurring unit

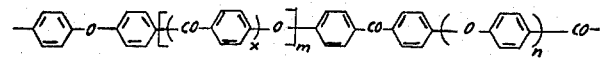

wherein $m$, $n$ and $x$ are 0 or 1 ($n$ being 0 when $x$ is 1) are prepared by $HF/BF_3$-catalyzed polymerization at 0°C of appropriately chosen nucleophilic and electrophilic coreactants, preferably terephthaloyl chloride and 1,4-diphenoxybenzene ($m=1$, $x$ and $n=0$).

14 Claims, No Drawings

NOVEL POLYKETONES

CROSS-REFERENCE TO RELATED APPLICATION

This is a continuation-in-part of our application Ser. No 378,616, filed July 12, 1973 now abandoned.

BACKGROUND OF THE INVENTION

Of recent years, aromatic polyketones have generated widespread interest by reason of their resistance to thermal degradation. In large part, interest has focused on polyketones having the repeat unit

(Here and in the claims, a six-membered ring signifies phenyl or phenylene, as the case may be). Following Bonner U.S. Pat. No. 3,065,205, polyketones having the above repeat unit may be prepared by Friedel-Crafts catalyzed polymerization of phosgene and diphenyl ether. The same repeat unit is additionally described in British Pat. No. 1,086,021 to M. E. B. Jones to obtain by polycondensation of diphenyl ether-4-carbonyl chloride, and from the reaction of diphenyl ether and diphenyl ether-4,4'-dicarbonyl chloride.

A number of patents which include reference to improved methods of making such polyketones have since issued. For example processes disclosed in U.S. Pat. Nos. 3,441,538 and 3,442,857 derive advantage by resort hydrogen dydrogen fluoride-enhanced boron trifluoride catalysis. Melt processable polymers characterized by that repeat unit are prepared in the copending, commonly assigned application of Klaus J. Dahl, Ser. No. 218,465, filed Jan. 17, 1972 now abandoned, where additional art is discussed.

Aromatic polyketones having other repeat units have been investigated to some extent. Melt processable polyketones having the repeat unit

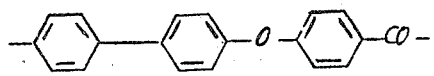

are described in the copending, commonly assigned application of Klaus J. Dahl (Ser. No. 218,466, filed Jan. 17, 1972, now abandoned) as arising from, eg, HF/BF$_3$-catalyzed polymerization of biphenylyloxybenzoyl chloride. According to R. N. Johnson et al, G.B. Pat. No. 1,078,234 polymers having the repeat unit

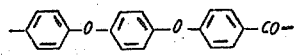

and melting at 350°C arise from reaction of hydroquinone and 4,4'-difluorobenzophenone.

It would be of substantial advantage if aromatic polyketones having acceptable properties could be secured employing as reactants materials more commonly and cheaply available than those most often employed in past work. One known aromatic polyketone, that having the repeat unit has been economically prepared by reaction of diphenyl ether and terephthaloyl chloride but Berr, in U.S. Pat. No. 3,516,966, reports that the HF/BF$_3$-catalyzed polymerization of those reactants affords melt-unstable product. Berr accordingly prepared copolyketone having a substantial content of isophtyaloyl residue, and reported the product as melt stable. In our hands the Berr process afforded polymer of satisfactory molecular weight, but compression molded slabs exhibited excessive gel content, indicative of a substantial degree of thermal crosslinking during melt processing. We have since determined that diphenyl ether is unstable in the HF/BF$_3$ system under the conditions preferred by Berr, leading to side reactions of an as yet undefined but plainly problematic nature. Now, by judicious choice of reactants and process conditions, we have obtained through HF/BF$_3$-catalyzed polymerization novel and economic aromatic polyketones whose inherent viscosity is essentially unaffected by compression molding at 410°C for 5 minutes at, eg, 10,000 psi.

BRIEF SUMMARY OF THE INVENTION

According to this invention there are provided aromatic polyketones predominately comprised of the recurring structural unit

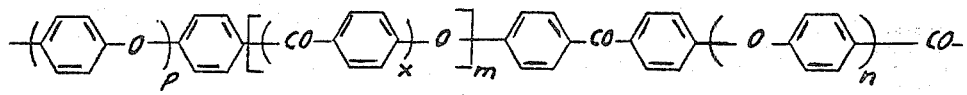

wherein each of $x$, $m$ and $n$ are 0 or 1, $p$ is an integer from 1 to 4, $n$ is 0 where $x$ is 1, and wherein when $p$ is greater than 1, $m$ is 1 and $x$ is 0, the inherent viscosity of which polymers being essentially unaffected by compression molding at, eg, 410°C for 5 minutes at 10,000 psi.

DETAILED DESCRIPTION OF THE INVENTION

Representative coreactants useful in forming the homopolymers which are preferred in the practice of this invention are listed in the table which follows. Each is a known compound which is prepared from standard literature procedures.

TABLE 1

PREFERRED HOMOPOLYMER COREACTANTS

| POLYMER NO. | p | m | n | x | Nucleophilic Reactant | Electrophilic Reactant |
|---|---|---|---|---|---|---|
| 1 | 1 | 1 | 0 | 0 | 1,4-diphenoxybenzene | terephthaloyl chloride |
| 2 | 1 | 1 | 1 | 0 | 1,4-diphenoxybenzene | 4,4'-diphenylether diacid chloride |
| 3 | 1 | 1 | 0 | 1 | 4,4'-bisphenoxybenzophenone | terephthaloyl chloride |
| 4 | 1 | 0 | 0 | 0 | 4-phenoxybiphenyl | terephthaloyl chloride |
| 5 | 1 | 0 | 1 | 0 | 4-phenoxybiphenyl | 4,4'-diphenylether diacid chloride |

In the case of the electrophilic reactant, the leaving group may be, albeit preferably is not, other than chlorine, eg, methoxy, hydroxy, etc. For the case where $p$ is 2, 3 4, 4, any of the electrophilic coreactants may be employed with, respecitvely, tetra-, penta- or hexaphenylene ether. The former reactant is obtained by condensation of 2 moles of phenol with 1 mole of 4,4'-dibromodiphenylether. Pentaphenylene ether is secured by condensing 1,4-dibromobenzene (1 mole) and 2 moles of 4-hydroxydiphenylether, while the nucleophilic coreactant last-mentioned is readily afforded by condensation of 4,4'-dibromodiphenylether (1 mole) and 2 moles of 4-hydroxydiphenylether.

Preferably, essentially all of the repeat units of the polymer are identical. In such cases, the essentially para polymer may be expected to exhibit thermooxidative stability superior to polymers characterized by substantial meta linkage, like those arising where, eg, mixtures of terephthaloyl and isophthaloyl chloride are employed as electrophilic reactants. Of course, even where only terephthaloyl chloride or a like "para" reactant is employed, it is likely inevitable that a minor number, eg several percent, of the repeat units will contain isomeric linkages arising from attack of the electrophilic reactant on the growing polymer chain at positions other than para.

More generally, the invention comprises copolyketones, eg, those predominately comprised of a single repeat unit conforming to the structural formula last depicted. Among suitable candidates for copolymerization may be mentioned the following nucleophilic coreactants:

| | |
|---|---|
| diphenyl sulfide | 4,4'-diphenoxybiphenyl |
| p-phenoxyphenol | 2,2'-diphenoxybiphenyl |
| p-phenylphenol | 1,2-diphenoxybenzene |
| dibenzofuran | 1,3-diphenoxybenzene |
| thianthrene | 1-phenoxynaphthalene |
| phenoxathiin | 1,2-diphenoxynaphthalene |
| phenodioxin | diphenyl ether |
| diphenylene | 1,5-diphenoxynaphthalene |

Similarly, the following electrophilic coreactant candidates for copolyketone formation may be mentioned:
  phosgene
  carbonyl difluoride
  isophthaloyl chloride
  benzene-1,4-di(sulfonyl chloride)
  benzene-1,3-di(sulfonyl chloride)
  2-chlorobenzene-1,4-disulfonyl chloride
  thio-bis(4,4'-benzoyl chloride)
  oxy-bis(4,4'-benzene sulfonyl chloride)
  benzophenone-4,4'-di(carbonyl chloride)
  oxy-bis(3,3'-benzoyl chloride)
  thio-bis(3,3'-benzene sulfonyl chloride)
  oxy-bis(3,3'-benzene sulfonyl chloride)
  diphenyl-3,3'-di(carbonyl chloride)
  carbonyl-bis(3,3'-benzoyl chloride)
  sulfonyl-bis(4,4'-benzoyl chloride)
  sulfonyl-bis(3,3'-benzoyl chloride)
  sulfonyl-bis(3,4'-benzoyl chloride)
  thio-bis(3,4'-benzoyl chloride)
  diphenyl-3,4'-di(carbonyl chloride)
  oxy-bis[4,4'-(2-chlorobenzoyl chloride)]
  naphthalene-1,6-di(carbonyl chloride)
  naphthalene-1,5-di(carbonyl chloride)
  naphthalene-2,6-di(carbonyl chloride)
  naphthalene-1,5-di(sulfonyl chloride)
  oxy-bis[7,7'-naphthalene-2,2'-di(carbonyl chloride)]
  thio-bis[8,8'-naphthalene-1,1'di(carbonyl chloride)]
  7,7'-binaphthyl-2,2'-di(carbonyl chloride)
  diphenyl-4,4'-di(carbonyl chloride)
  carbonyl-bis[7,7'-naphthalene-2,2'-di(carbonyl chloride)]
  sulfonyl-bis[6,6'-naphthalene-2,2'-di(carbonyl chloride)]
  dibenzofuran-2,7-di(carbonyl chloride)

Parentheticaly, our preferred process conditions may be employed in the formation of homopolymers, many of them novel, from the above-listed coreactants. Where the copolyketone coreactant is more than binuclear the copolyketone should, by preference, contain at least about 70%, most preferably at least about 80% repeat units answering to the generic structure last depicted.

In a further embodiment of the invention we prepare linear, crystalline melt-stable polymers predominately and, most preferably, essentially comprised of the repeat unit

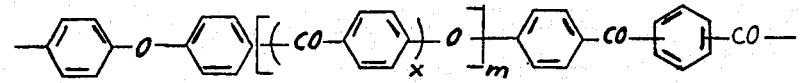

wherein the moieties of structure

are, for each repeat unit, independently selected from the group consisting of para and meta, $x$ and $m$ being as earlier defined. Preferably, up to 50% of the

moieties are meta, most preferably from about 10% to about 50%. Such polymers are prepared just as in the case of all-para polymers, save that some or all of the electrophilic terephthaloyl chloride reactant is replaced by is phthaloyl chloride. The use of mixed terephthaloyl and isophthaloyl chlorides permits variation of the melt temperature between 271° and 360°C for the system

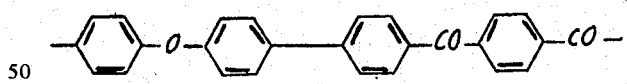

copolymers of this type may confer greater latitude in extrusion temperatures and afford improved compatibility for blending with other resins to obtain special effects, such as plasticization. Additional advantages which may accrue from this deviation from an all-para polymer system include changes in crystallization behavior and attendant effects on stress corrosion in fluids, or at elevated temperatures.

Preferably the polymers of the invention exhibit inherent viscosity of at least about 0.4, more preferably from about 0.5 to about 2.0, and most preferably from about 0.7 to 1.5. Molecular weight may be controlled by capping, as taught in the aforesaid application of Dahl, Ser. No. 136,236, the disclosure of which is incorporated herein by reference. Preferred capping agents contain a ketonic linkage, eg, 4-phenoxybenzophenone.

In preparing the polymers of the invention by the preferred procedure, equal molar amounts of nucleophilic and electrophilic (dichloride) coreactants are combined, optionally with minor amounts of monofunctional capping agent, and sufficient anhydrous HF added to form, at 0°C, a 10% wt. solution. At −20°C to 10°C, preferably 0°C, after first allowing all HCl to evolve, $BF_3$ is added under 30 psi pressure, the material permitted to react for about 6 hours, and the polymerization mixture then diluted with $SO_2$ or additional HF to form a solution containing about 5% wt. solids. Recovery is by spray drying or precipitation in a Waring blendor into $H_2O$ (room temperature) or methanol (−78°C). Fluorine and boron content of the resulting product is reduced by water wash and the material then dried at 150°C and 20 mm Hg for 3–5 hours. All reactions are performed in transition metal-free environs.

In the following examples of preferred embodiments of the invention, all parts and percentages are by weight and all temperatures in centigrade degrees unless otherwise indicated.

EXAMPLE 1

A 50 ml. polychlorotrifluoroethylene tube was charged with 1.2984g (4.95 mmoles) of 1,4-diphenoxybenzene, 1.0049g (4.95 mmoles) of terephthaloyl chloride, 0.0027g (0.01 mmoles) of 4-phenoxybenzophenone (capping agent) and a stir bar. To this mixture was slowly added 20 ml of anhydrous hydrogen fluoride. The tube was then connected to a polychlorotrifluoroethylene vacuum line (Toho Kasei Co. Ltd., Osaka, Japan) and purged with nitrogen while cooling to 0°C. Boron trifluoride gas was admitted and the reaction mixture was held at 30 psi pressure for 6 hr. to give a viscous orange-red solution. Excess boron trifluoride was purged from the reaction system, the polymer solution was diluted with anhydrous hydrogen fluoride, and then poured into rapidly stirred, cold (−78°) methanol. The resultant polymer precipitate was filtered and washed with water and methanol, followed by drying at 180–200 /20 mm Hg to yield colorless, fluffy material, which was annealed at 230° for 20 minutes. Inherent viscosity before and after compression molding, elemental composition and physical characteristics of the polymer are set out, respectively, in Table II – IV, infra. In the case of this and the following Examples, compression molding at 410° for 5 minutes at a pressure of 10,000 psi afforded nearly colorless, flexible slabs. It is particularly noteworthy that in every case inherent viscosity was essentially unaffected by compression molding. This also held true when, in related work, diphenyl ether and terephthaloyl chloride were reacted by the foregoing procedure to afford polymer having the repeat unit

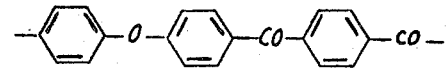

In the latter case inherent viscosity of the powder was 0.53 and that of the slab 0.49. All inherent viscosities are mean values obtained according to the method of Sorenson et al., *Preparative Methods of Polymer Chemistry*, Interscience (1968) p. 44 [0.1 g. polymer in 100 ml. soln. of concentrated $H_2SO_4$ at 25°C]. Melting points were determined with a Perkin Elmer Differential Scanning calorimeter.

EXAMPLES 2–5

The additional polymers listed in Table 1 were prepared following the procedure of Example 1 and their properties determined as set out in Tables II – IV. In the case of Example 5 no melt point was determined, though the material is estimated to melt at a temperature within the range 300°–350°C.

TABLE II

| EXAMPLE | m n x | MONOMERS | Inherent Viscosity Powder | slab | mp (C) |
|---|---|---|---|---|---|
| 1 | 1 0 0 | terephthaloyl chloride, 4,4'-diphenoxybenzene | 0.90 | 0.91 | 360 |
| 2 | 1 1 0 | 4,4'-diphenylether diacid chloride 4,4'-diphenoxybenzene | 1.62 | 1.62 | 340 |
| 3 | 1 0 1 | terephthaloyl chloride, 4,4'-bisphenoxybenzophenone | 1.31 | 1.35 | 370 |
| 4 | 0 0 0 | terephthaloyl chloride 4-phenoxybiphenyl | 0.43 | 0.45 | 402 |
| 5 | 0 1 0 | 4,4'-diphenylether diacid chloride 4-phenoxybiphenyl | 2.77 | 2.76 | — |

TABLE III

| EXAMPLE | Repeat Unit Formula | ELEMENTAL COMPOSITION | | | |
|---|---|---|---|---|---|
| | | Carbon calcd | fd | Hydrogen calcd | fd |
| 1 | $C_{26}H_{16}O_4$ | 79.58 | 79.35 | 4.11 | 4.26 |
| 2 | $C_{32}H_{20}O_5$ | 79.33 | 79.02 | 4.16 | 4.17 |
| 3 | $C_{33}H_{20}O_5$ | 79.83 | 79.90 | 4.45 | 4.15 |
| 4 | $C_{26}H_{16}O_3$ | 82.96 | 82.33 | 4.28 | 3.90 |
| 5 | $C_{32}H_{20}O_4$ | 82.04 | 82.34 | 4.30 | 3.81 |

TABLE IV
PHYSICAL CHARACTERISTICS OF THE POLYMERS

| EXAMPLE | IR(KBr) cm⁻¹ -CO- | IR(KBr) cm⁻¹ -O- | NMR(CF$_3$SO$_3$H⁺) Protons in Proximity of -O- | NMR(CF$_3$SO$_3$H⁺) Protons in Proximity of -CO- | | | X-Ray Diffraction Patterns 2θ Angle, Degrees (Intensity*) | | | |
|---|---|---|---|---|---|---|---|---|---|---|
| 1 | 1660 | 1250 | 7.57(m,8) | 8.48(m,8) | | | 19(s) | 21(s) | 23(s) | 29(m) |
| 2 | 1660 | 1250 | 7.63(m,12) | 8.40(m,8) | 8.17(m,2) | 12.5(w) | 18.5(s) | 20.5(m) | 22.5(m) | 28.5(m) |
| 3 | 1660 | 1250 | 7.77(m,8) | 8.55(m,12) | | 13(w) 16(m) | 18.5(s) | | 22.5(s) | 28(w) |
| 4 | 1660 | 1250 | 7.60(m,4) | 8.48(m,12) | | | 18.5(m) | 19.5(w) | 22.5(s) | 28.5(w) |
| 5 | 1660 | 1250 | 7.72(m,8) | 8.44(m,12) | | 13(w) | | 19.5(w) | 23.5(w) | 29.5(w) |

⁺δ, ppm (splitting pattern, number of protons) External standard: TMS
*w=weak, m=medium, s=strong

EXAMPLE 6

Polymerization of 1,4-Diphenoxybenzene With Isophthaloyl Chloride

Anhydrous hydrogen fluoride was saturated with boron trifluoride at −23° and 30 psi pressure for 4 hr. A 50-ml reaction tube was charged with 1.3050 g (4.975 mmoles) of 1,4-diphenoxybenzene, 1.0151 g (5mmoles) of isophthaloyl chloride, 0.0137 g (1 mole %) of p-phenoxybenzophenone and a stir bar. To this mixture was added slowly 10 ml of the cold (−78°) boron trifluoride saturated hydrogen fluoride solution, and the reaction tube was connected to the vacuum line. A boron trifluoride pressure of 30 psi was applied and the polymerization was allowed to proceed at 0° for 16 hr. to give a viscous, orange solution. Excess boron trifluoride was purged from the reaction system, the polymer solution was diluted with hydrogen fluoride and then poured into rapidly stirred, cold (0°) water. The resultant polymer precipitate was filtered and washed with water, followed by drying at 150°/20 mm Hg to yield colorless, fluffy material. The material showed an inherent viscosity of 1.36. Compression molding at 400° for 5 min produced a flexible slab of inherent viscosity of 1.37. Differential scanning colorimetry indicated a glass transition temperature of 153° and a crystalline melting temperature of 271° (scan rate: 20 /min) Thermogravimetric analysis in air showed a 10% weight loss at 600 (scan rate: 20°/min). Molecular spectroscopy revealed the following data which are consistent with a linear polymer of repeating unit:

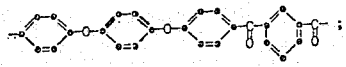

infrared (film cast from hydrogen fluoride): 1655cm⁻¹ [ketone link], 1235 cm⁻¹ [ether link]; ultraviolet (conc. sulfuric acid) max., 407nm (ε, 4.8 × 10⁴); nuclear magnetic resonance (ClCF$_2$—COCF$_2$Cl⁻ D$_2$O/CDCl) = 1:1): , ppm: 7.18 (doublet, 4H, J = 9 Hz), 7.28 (singlet, 4H), [protons in ortho position to ether linkage]; 7.82 (singlet, 3H), 8.08 (doublet, 4H J = 9 Hz), 8.18 (singlet, 1H) [protons in proximity of ketone linkages].

EXAMPLE 7

Polymerization of 1,4-Diphenoxybenzene With Mixture of Terephthaloyl Chloride and Isophthaloyl Chloride The experiment detailed in the preceding example was repeated, but mixtures of terephthaloyl chloride and isophthaloyl chloride were used. Acid chloride ratios employed and data of polymer characterization are shown in Table 5 attached.

The products of this invention are film and fiber-forming polymers suitable for use in electrical insulation, as by melt extrusion over wires cables, and the like. Preferred polymers are crystalline materials melting at a temperature in the range 340°-404°C. Those in which carbonyl moieties are present in number greater than ether oxygen may be expected to crystallize substantially more quickly than, eg, poly (benzophenone ether), holding out the promise that the post-annealing step commonly practiced with extrudates of the latter polymer can be eliminated without adversely affecting properties such as tensile strength and resistance to scrap abrasion and environmental stress corrosion. Polymers prepared according to this invention whose melt points are on the order of 400°C or higher, when employed in electrical insulation, are advantaged

TABLE V

| Molar Ratio of Terephthaloyl and Isophthaloyl Chloride | Inherent Viscosity | | Glass Transition Temp. | Melting Point | Ultraviolet Spectrum Max, nm |
|---|---|---|---|---|---|
| | Powder | Slab (400 /5 min.) | C | C | (Conc. H$_2$SO$_4$) |
| 90:10 | 1.44 | 1.40 | 164 | 337 | 416 |
| 75:25 | 1.51 | 1.53 | 164 | 328 | 413 |
| 50:50 | 1.45 | 1.42 | 154 | 294 | 410 | thereby in resisting loss of insulative integrity through inadvertent contact with soldering irons.

What is claimed:
1. A substantially linear crystalline polymer predominately comprised of a single repeat unit of structure

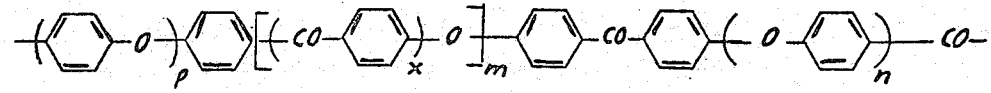

wherein each of x, m and n are 0 or 1, p is an integer from 1 to 4, n is 0 when x is 1, and wherein m is 1 and x is 0 when p is greater than 1, the inherent viscosity of said polymer being at least about 0.4 and essentially unaffected by compression molding at 410°C for 5 minutes at 10,000 p.s.i., said inherent viscosity being determined at 25°C with 0.1 gram of polymer in a 100 milliliter solution of concentrated $H_2SO_4$.

2. A polymer according to claim 1 whose repeat units consist essentially of said repeat unit.

3. A substantially linear crystalline polymer predominately comprised of a single repeat unit of structure

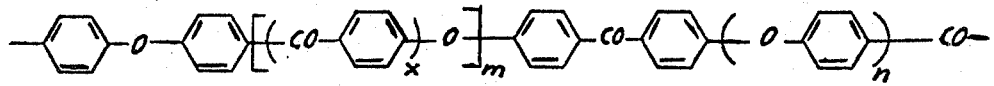

wherein each of $m$, $n$ and $x$ are 0 or 1 and wherein when $x$ is 1, $n$ is 0, the inherent viscosity of said polymer being at least about 0.4 and essentially unaffected by compression molding at 410°C for 5 minutes at 10,000 p.s.i., said inherent viscosity being determined at 25°C with 0.1 gram of polymer in a 100 milliliter solution of concentrated $H_2SO_4$.

4. A polymer according to claim 3 wherein in said repeat unit $m$ is 1 and each of $x$ and $n$ are 0.

5. A polymer according to claim 3 wherein in said repeat unit each of $m$, $n$ and $x$ are 0.

6. A crystalline linear polymer consisting essentially of repeat units selected from the group consisting of structures of formulae

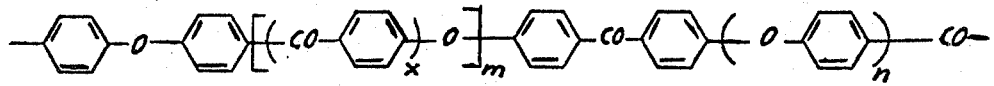

wherein each of $m$, $n$ and $x$ are 0 or 1 and wherein when $x$ is 1, $n$ is 0, the inherent viscosity of said polymer being at least about 0.4 and essentially unaffected by compression molding at 410°C for 5 minutes at 10,000 p.s.i., said inherent viscosity being determined at 25°C with 0.1 gram of polymer in a 100 milliliter solution of concentrated $H_2SO_4$.

7. A homopolymer according to claim 6 exhibiting inherent viscosity within the range from about 0.5 to about 2.0.

8. A homopolymer according to claim 7, consisting essentially of repeat units of structure

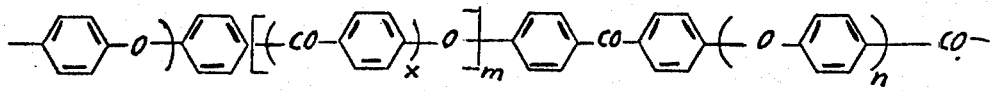

9. A homopolymer according to claim 7, consisting essentially of repeat units of structure

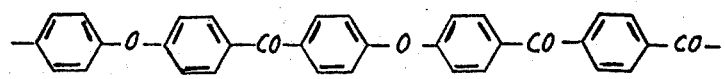

10. A homopolymer according to claim 7, consisting essentially of repeat units of structure

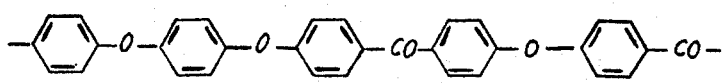

11. A homopolymer according to claim 7, consisting essentially of repeat units of structure

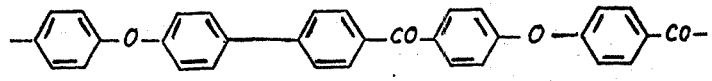

12. A homopolymer according to claim 7, consisting essentially of repeat units of structure

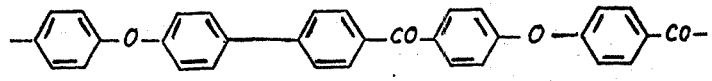

13. A linear, crystalline melt-stable polymer containing repeat units of the formula

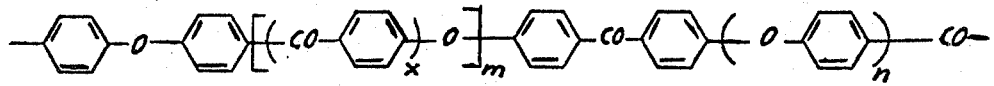

wherein said $x$ and $m$ are 0 or 1 and wherein said moieties are selected from a group of meta and para moieties.

14. A polymer according to claim 13 wherein said moieties are from about 10 to 50% meta moieties.

* * * * *

REEXAMINATION CERTIFICATE (971st)
United States Patent [19]
Dahl et al.

[11] B1 3,956,240
[45] Certificate Issued  Dec. 27, 1988

[54] NOVEL POLYKETONES

[75] Inventors: Klaus J. Dahl, Palo Alto; Viktors Jansons, Los Gatos, both of Calif.

[73] Assignee: Raychem Corporation, Menlo Park, Calif.

Reexamination Request:
No. 90/001,411, Jan. 11, 1988

Reexamination Certificate for:
Patent No.: 3,956,240
Issued: May 11, 1976
Appl. No.: 502,643
Filed: Sep. 3, 1974

Related U.S. Application Data

[63] Continuation-in-part of Ser. No. 378,616, Jul. 12, 1973, abandoned.

[51] Int. Cl.⁴ .............................................. C08G 8/02
[52] U.S. Cl. ..................................... 528/125; 528/151; 528/154; 528/155; 528/176; 528/196; 528/220
[58] Field of Search ............... 528/125, 151, 154, 155, 528/176, 196, 220

[56] References Cited

U.S. PATENT DOCUMENTS

| | | | |
|---|---|---|---|
| 3,441,538 | 4/1969 | Marks | 528/86 |
| 3,674,627 | 7/1972 | Angelo | 428/377 |
| 3,764,583 | 10/1973 | Newton et al. | 528/174 |
| 3,767,620 | 10/1973 | Angelo et al. | 525/419 |
| 3,791,890 | 2/1974 | Gander et al. | 528/180 |
| 3,809,682 | 5/1974 | Studlinka | 528/174 |
| 3,953,400 | 4/1976 | Dahl | 528/179 |

FOREIGN PATENT DOCUMENTS

| | | |
|---|---|---|
| 2220079 | 11/1972 | Fed. Rep. of Germany |
| 40-65244 | 6/1965 | Japan |
| 971227 | 9/1964 | United Kingdom |
| 1060611 | 3/1967 | United Kingdom |
| 1078234 | 8/1967 | United Kingdom |
| 1086021 | 10/1967 | United Kingdom |
| 1177183 | 1/1970 | United Kingdom |
| 1238124 | 7/1971 | United Kingdom |
| 1250251 | 10/1971 | United Kingdom |

OTHER PUBLICATIONS

Farnham et al., J. Polym. Sci. A-1, vol. 5, 2375 (1967).

*Primary Examiner*—John Kight, III

[57] ABSTRACT

Melt-stable aromatic polyketones useful in, eg, electrical insulation and comprised of, eg, the recurring unit

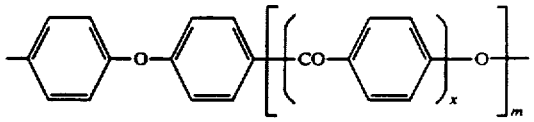

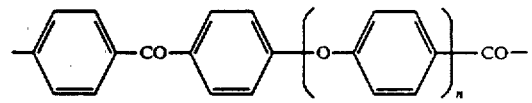

wherein m, n and x are 0 or 1 (n being 0 when x is 1) are prepared by $HF/BF_3$-catalyzed polymerization at 0° C. of appropriately chosen nucleophilic and electrophilic coreactants, preferably terephthaloyl chloride and 1,4-diphenoxybenzene (m=1, x and n=0).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–12 is confirmed.

Claim 13 is determined to be patentable as amended.

Claim 14, dependent on an amended claim, is determined to be patentable.

New claims 15 and 16 are added and determined to be patentable.

13. A linear, crystalline melt-stable polymer containing repeat units of the formula wherein said [x and] m [are] *is* 0 or 1 and wherein said

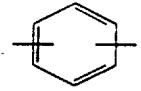

are selected from a group of meta and para moieties, *the inherent viscosity of said polymer being at least about 0.4 when determined at 25° C. with 0.1 g of polymer in a 100 milliliter solution of concentrated sulfuric acid.*

*15. A substantially linear crystalline polymer in accordance with claim 1 wherein p is 1.*

*16. A linear, crystalline melt-stable polymer containing repeat units of the formula*

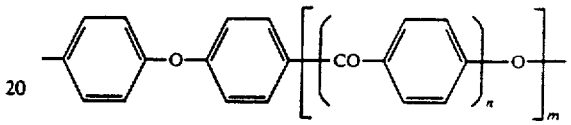

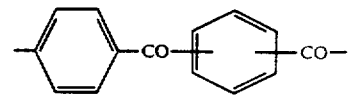

*wherein said x and m are 0 or 1 and wherein said moieties*

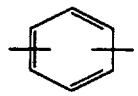

*are selected from the groups of meta and para moieties, the inherent viscosity of said polymer being within the range from about 0.5 to about 2.0 and essentially unaffected by compression molding at 410° C. for 5 minutes at 10,000 psi, said inherent viscosity being determined at 25° C. with 0.1 g of polymer in a 100 milliliter solution of concentrated sulfuric acid.*

* * * * *